(12) United States Patent
Manahan et al.

(10) Patent No.: US 8,904,379 B2
(45) Date of Patent: Dec. 2, 2014

(54) CENTRALLY CONTROLLED PROXIMITY BASED SOFTWARE INSTALLATION

(75) Inventors: Peter R. Manahan, New York (CA); Leho Nigul, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 13/527,116

(22) Filed: Jun. 19, 2012

(65) Prior Publication Data
US 2012/0331460 A1  Dec. 27, 2012

(30) Foreign Application Priority Data

Jun. 23, 2011 (CA) ..................................... 2744165

(51) Int. Cl.
*G06F 9/445* (2006.01)
*H04L 29/08* (2006.01)
(52) U.S. Cl.
CPC ......... *G06F 8/61* (2013.01); *H04L 67/34* (2013.01); *H04L 67/18* (2013.01)
USPC ............ 717/178; 717/173; 717/174; 717/175
(58) Field of Classification Search
None
See application file for complete search history.

(56) References Cited

U.S. PATENT DOCUMENTS

| | | | | |
|---|---|---|---|---|
| 6,189,105 | B1 * | 2/2001 | Lopes ............................. | 726/20 |
| 7,162,538 | B1 | 1/2007 | Cordova | |
| 7,398,524 | B2 * | 7/2008 | Shapiro ......................... | 717/175 |
| 7,461,374 | B1 | 12/2008 | Balint et al. | |
| 7,549,149 | B2 | 6/2009 | Childress et al. | |
| 7,853,609 | B2 | 12/2010 | Dehghan et al. | |
| 2002/0147974 | A1 * | 10/2002 | Wookey ........................ | 717/176 |
| 2002/0157089 | A1 * | 10/2002 | Patel et al. .................... | 717/178 |
| 2003/0221190 | A1 | 11/2003 | Deshpande et al. | |
| 2004/0015961 | A1 * | 1/2004 | Chefalas et al. ............... | 717/178 |
| 2004/0031030 | A1 * | 2/2004 | Kidder et al. ................. | 717/172 |
| 2005/0044545 | A1 * | 2/2005 | Childress et al. ............. | 717/177 |
| 2005/0203968 | A1 * | 9/2005 | Dehghan et al. .............. | 707/203 |
| 2006/0168581 | A1 | 7/2006 | Goger et al. | |
| 2007/0208834 | A1 * | 9/2007 | Nanamura et al. ............ | 709/220 |
| 2008/0313282 | A1 * | 12/2008 | Warila et al. .................. | 709/206 |
| 2009/0300596 | A1 * | 12/2009 | Tyhurst et al. ................ | 717/173 |
| 2010/0169560 | A1 * | 7/2010 | Brunet et al. ................. | 711/103 |
| 2010/0333080 | A1 | 12/2010 | Keys et al. | |
| 2011/0138374 | A1 * | 6/2011 | Pal ................................ | 717/169 |
| 2012/0198439 | A1 * | 8/2012 | Kane ............................. | 717/177 |
| 2013/0016667 | A1 * | 1/2013 | Blomqvist et al. ............ | 370/329 |
| 2013/0174142 | A1 * | 7/2013 | Burke et al. ................... | 717/176 |

OTHER PUBLICATIONS

Kreutz et al., A Peer-to-Peer Architecture for Automatic Software Package Installation on Heterogeneous Clusters Brazil.

* cited by examiner

*Primary Examiner* — Chameli Das
(74) *Attorney, Agent, or Firm* — Yudell Isidore PLLC; Parashos Kalaitzis

(57) ABSTRACT

An illustrative embodiment of a computer-implemented process for a centrally controlled proximity based software installation receives a request to install a software package, sends a list of machines associated with the received request to a rules engine and generates a set of proximity groups using the list of machines. The computer-implemented process uploads the software package of the received request to a selected machine within a proximity group of the set of proximity groups, instructs the selected machine to install the software package and instructs the remaining machines associated with the proximity group of the selected machine to download the software package from the selected machine and to install the software package. Responsive to a determination that no more requests exist, the computer-implemented process reports to a central installer.

17 Claims, 6 Drawing Sheets

Proximity-based installer 300 ately CENTRALLY CONTROLLED PROXIMITY BASED SOFTWARE INSTALLATION

PRIORITY CLAIM

The present application claims benefit of priority under 35 USC §120 and §365 to the previously filed Canada Patent Application No. 2744165 titled, "Centrally Controlled Proximity Based Software Installation" with a priority date of Jun. 23, 2011. The content of that application is incorporated by reference herein.

BACKGROUND

1. Technical Field

This disclosure relates generally to software installation in a data processing system and more specifically to centrally controlled proximity based software installation in the data processing system.

2. Description of the Related Art

A typical large enterprise has a need for centralized management involving installation and update of various software packages deployed on hundreds and perhaps thousands of devices distributed in various locations across the enterprise. Attempted solutions exist to address this need. All of these solutions typically either (a) cause network capacity to be exceeded and overload certain central machines, while enabling large scale use cases or (b) introduce increasing management overhead to manage multiple mirror machines which are clones of central machines.

The problems typically occur because enterprise software packages tend to be large. For example, a cumulative fix-pack may easily pass a 500-megabyte mark. This means that when such maintenance is rolled out to hundreds of machines, the volume of data that crosses the enterprise network is very large. The large volume causes congestion and a resulting reduction in throughput for other network traffic or disruption of service due to bottlenecks or failure.

Typical known solutions include performing installation or update operations in batches. However this approach might result in hours or days to update a large set of targets, especially when the targets are located in different geographies. Another approach uses mirror sites, defining multiple predefined repositories in various geographies to spread the burden across different locations. While this solution can be somewhat more scalable, mirroring also typically has a number of potentially serious disadvantages. In one example, increasing numbers of mirror locations means more updates because as a new version of software becomes available, all mirror locations have to be updated first, which might take substantial time and effort in addition to the effort required for individual machines. In a related example, mirror site locations are predefined, leading to similar scalability issue due to limitations of the number of sites when many machines in a specific geography try to access a specific mirror site.

In another example, use of a tree-based topology causes updates to propagate from a parent node to a child node of the structure. While this approach makes an installation process more distributed, significant overhead is created through imposing parent/child relationship definitions for the installation nodes and maintaining relationships current.

A further example maintains predefined sets of nodes to which an update is sent. The predefined sets of nodes then cause the updates to be sent to another predefined sets of nodes. However the predefined sets of nodes, for example, lists of nodes, are static and significant management overhead is typically required to maintain the accuracy and relevance of the lists.

Yet another example solution identifies a master device, which governs the installation of an update or package on multiple slave devices. While this approach allows for central control of the installation and update process, however the master and slaves relationships do not address the impact on network capacity when the master initiates broadcasting of a software package to a large number of slaves.

SUMMARY

According to one embodiment, a computer-implemented process for a centrally controlled proximity based software installation receives a request to install a software package to form a received request, sends a list of machines associated with the received request to a rules engine, and generates a set of proximity groups using the list of machines. The computer-implemented process uploads the software package of the received request to a selected machine within a proximity group of the set of proximity groups, instructs the selected machine to install the software package and instructs the remaining machines associated with the proximity group of the selected machine to download the software package from the selected machine and to install the software package. Responsive to a determination that no more requests exist, the computer-implemented process reports to a central installer.

According to another embodiment, a computer program product for a centrally controlled proximity based software installation comprises computer recordable-type media containing computer executable program code stored thereon. The computer executable program code comprises computer executable program code for receiving a request to install a software package to form a received request, computer executable program code for sending a list of machines associated with the received request to a rules engine, computer executable program code for generating a set of proximity groups using the list of machines, computer executable program code for uploading the software package of the received request to a selected machine within a proximity group of the set of proximity groups, computer executable program code for instructing the selected machine to install the software package and instructing the remaining machines associated with the proximity group of the selected machine to download the software package from the selected machine, computer executable program code for instructing the remaining machines to install the software package; and computer executable program code responsive to a determination that no more requests exist, for reporting to a central installer.

According to another embodiment, an apparatus for a centrally controlled proximity based software installation comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive a request to install a software package to form a received request, send a list of machines associated with the received request to a rules engine, generate a set of proximity groups using the list of machines, upload the software package of the received request to a selected machine within a proximity group of the set of proximity groups, instruct the selected machine to install the software package and instruct the remaining machines associated with the proximity group of the selected machine to download the software package from the selected machine and to install the software package, and responsive to a determination that no more requests exist, report to a central installer.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
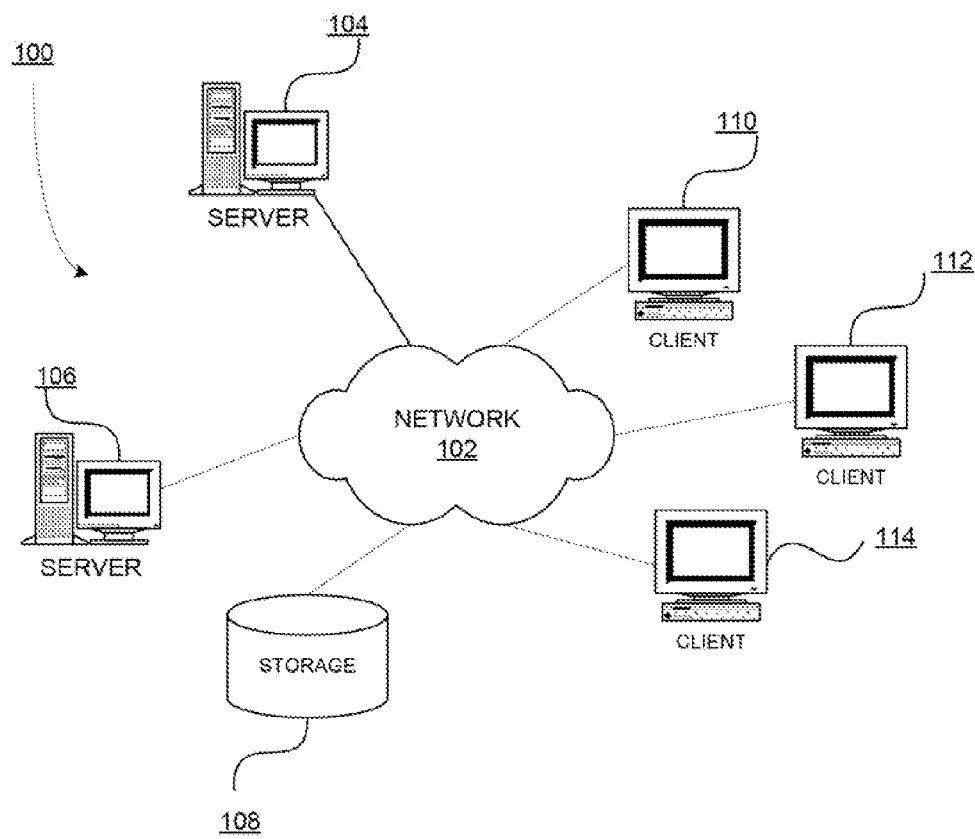
FIG. 1 is a pictorial representation of a network of data processing systems in which illustrative embodiments may be implemented.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present invention may take the form of a computer program product embodied in one or more computer readable medium(s)/devices having computer readable program code embodied thereon.

Any combination of one or more computer-readable medium(s)/devices may be utilized. The computer-readable medium may be a computer-readable signal medium or a computer-readable storage device. A computer-readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable storage device may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage device and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
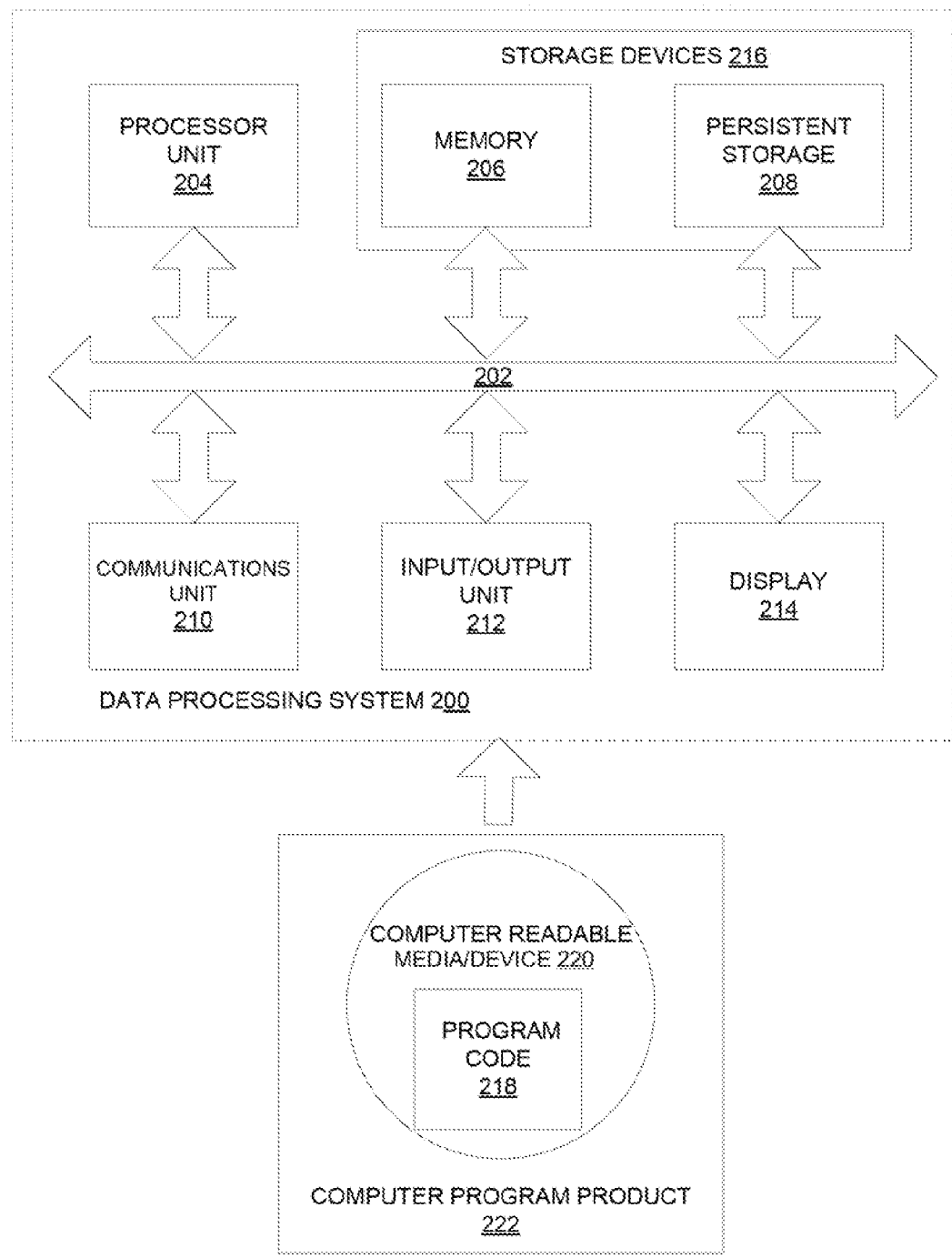
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media/devices, such as memory 206 or persistent storage 208.

Program code 218 is located in a functional form on computer readable media 220 that is selectively removable and program code 218 may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for a centrally controlled proximity based software installation is presented. The centrally controlled proximity based software installation provides an enterprise install using a central governor, which pushes a software package down to peer groups of systems, according to user-defined proximity rules, and leverages peer-to-peer mechanism to populate the installations within those groups.

Processor unit 204 receives a request (referred to herein as a received request), typically through communications unit 210, input/output unit 212 or storage devices 216, to install a software package. Processor unit 204 sends a list of machines associated with the received request to a rules engine and generates a set of proximity groups using the list of machines. Processor unit 204 uploads the software package of the received request, for example, from storage devices 216, to a selected machine within a proximity group of the set of proximity groups, for example, server 106 of network data processing system 100, through network 102, both of FIG. 1. Processor unit 204 instructs the selected machine to install the software package and instructs the remaining machines associated with the proximity group of the selected machine to download the software package from the selected machine. Processor unit 204 further instructs the remaining machines to install the software package, and responsive to a determination that no more requests exist, reports to a central installer.

In another example, a computer-implemented process, using program code 218 stored in memory 206 or as a computer program product 222, for a centrally-controlled proximity-based software installation comprises a computer recordable storage media, such as computer readable media 220, containing computer executable program code stored thereon. The computer executable program code comprises computer executable program code for managing a centrally controlled proximity based software installation.

The computer-implemented process provides a capability of a rule based central install management system for enabling proximity based installs. The process addresses network and specific node scalability without introducing additional complexities of managing multiple static mirror sites. An enterprise administrator is enabled to define rules for definition of proximity. Based on these rules, machines on a network can be dynamically categorized into proximity groups. A central install manager pushes a payload only to one machine in the proximity group, and then remaining machines in a same proximity group use this machine as a download proxy to drive installs for remaining machines in the proximity group.

Well-defined proximity rules typically enable multiple installs/updates to run in parallel without overloading specific machines or network segments. Rules are dynamic and can be easily reconfigured/adjusted to enable installs of various packages in various geographies. The rule engine is pluggable and can be easily extended/customized to utilize new definitions for proximity rules.

Central management of master binaries of the software packages is still maintained. There is no need to update multiple pre-defined mirror sites when a new version of software becomes available. The central installer pushes the installation down to systems such as those in peer groups of systems, according to the user-defined proximity rules, and in the case of peer groups, leverages a peer-to-peer mechanism to populate the installations within the proximity groups.

Figure 3:
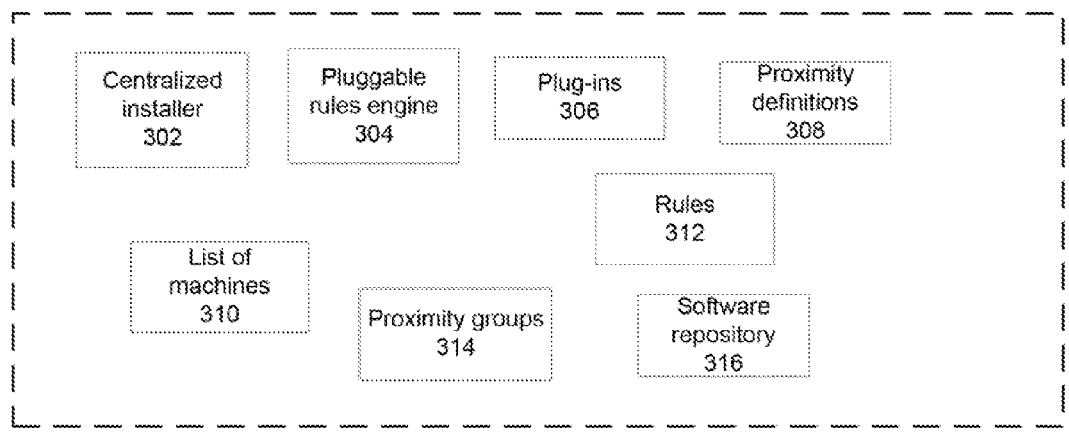
FIG. 3 is a block diagram of a proximity-based installer, in accordance with various embodiments of the disclosure.

With reference to FIG. 3, a block diagram of a proximity-based installer, in accordance with various embodiments of the disclosure is presented. Proximity-based installer 300 is an example embodiment of a centrally managed proximity-based installation system in accordance with the disclosure. Proximity-based installer 300 is supported using typical system components and services of a data processing system such as data processing system 200 of FIG. 2. Proximity-based installer 300 may be viewed as an extension of a data processing system or as a hybrid implementation providing a specialized data processing system. For example, proximity-based installer 300 comprises components, in addition to those of the supporting data processing system, including centralized installer 302, pluggable rules engine 304, plug-ins 306, proximity definitions 308, list of machine 310, rules 312, proximity groups 314, and software repository 316.

Centralized installer 302 provides a capability for driving installs/updates of products on multiple targets as well as tracking what is installed on each target. Centralized installer 302 interfaces with other components of proximity-based installer 300 to perform installation management tasks. For example, centralized installer 302 includes a receiver for receiving requests from a requester (a user or programmatic means such as an application) or an install administrator specifying a list of targets and instructions to carry out the operation (install/updates for certain software) on the targets using stored software products in software repository 316. Software repository 316 provides a capability of storing and maintaining software product information packaged for use by centralized installer 302 and machines in proximity groups 314. Software products include offerings in various forms including complete packages, updates and fixes comprising portions of software packages whether in source or in binary form. A typical package as used in examples to follow comprises a binary software package. Centralized installer 302 further comprises communication interfaces to perform installation management tasks such as sending software product information packaged for use by specified machines in proximity groups 314 and making operation results known to a requester or administrator, for example reporting.

Pluggable rules engine 304 comprises a capability for executing logic associated with interpreting proximity rules. A set of plug-ins in the form of plug-ins 306 is created for interpreting user-defined proximity rules of rules 312 created using proximity definitions 308. Additional plugins can be easily added or existing plug-ins can be modified as required enabling pluggable rules engine 304 to be flexible and extensible. An external interface for pluggable rules engine 304 accepts information in the form of list of machines 310 and rules definitions as proximity definitions 308 and creates a set of proximity groups based on the specified rules.

Proximity groups 314 comprise logical definitions of the generated proximity groups using list of machines 310 and rules 312, created using proximity definitions 308, as input. Proximity groups 314 are a set of groups of systems, for example, peer groups of systems, according to user-defined proximity rules of rules 312. Centralized installer 302 leverages a peer-to-peer mechanism to populate installations on machines within proximity groups 314. Other types of networked groups of systems, in addition to peer groups of the example may be used with the disclosed method.

List of machines 310 provides identification of machines for which updates are required to be performed. Proximity groups 314 are transitive and created as needed when a request for a software package or an update of an existing software package or component is received. The dynamic transitive property enables proximity groups 314 to change reflective of a current configuration requirement. In an alternative example, proximity groups 314 may be saved for reuse but saving does not provide the flexibility of the dynamic version. For example, ten machines may be provided in a list of machines as possible candidates for a software update. Applying the rules using the pluggable rules engine generates a pair of proximity groups wherein a first proximity group contains 5 machines clustered on the east coast and 3 machines clustered on the west coast, with 2 remaining machines excluded. In this example, geography and operating system type may have been factors in the rule or rules applied to categorize the list of machines.

In another example, rules 312 used by plug-ins 306 can have a format similar to PG1=9.26.27.*(for example, all targets with IP addresses starting with 9.26.27 will be considered a single proximity group PG1) or PG2=A.B.com, A1.B.com, A2.B.com (for example, explicitly naming the targets in the group) and PG3=PG1, PG2 (for example, a group of groups concept).

Other rules definition can be supported as well including use of programmatic expressions to selectively include or exclude machines. Since pluggable rules engine 304 is a pluggable system, administrators are enabled to create rule interpretation plugins. For example, proximity Group 1: Targets 1, 2, 3 are identified as a proximity group in one of the defined rules and proximity Group 2: Targets A, B, C, D are identified as a proximity group in another of the defined rules. In an alternative implementation, rules 312 can be definitions consumed directly by plug-ins 306, such as text files including plain text or markup language based definitions.

Figure 4:
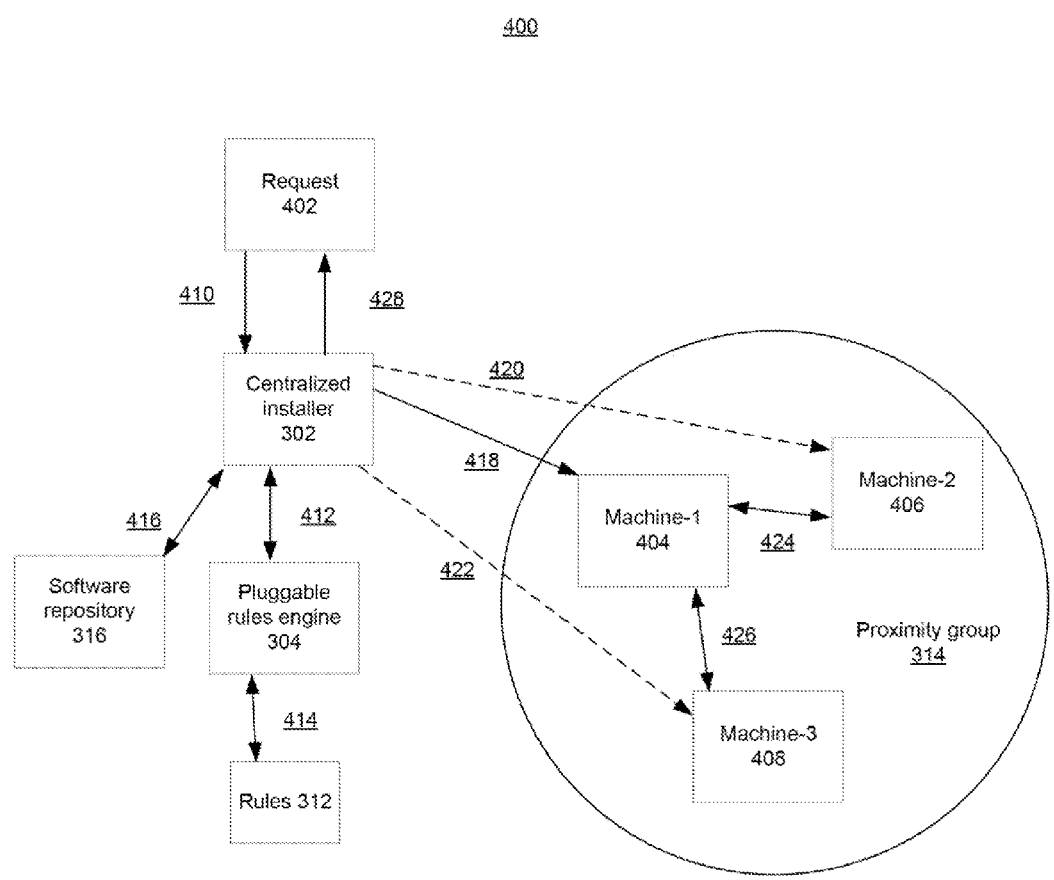
FIG. 4 is a block diagram of a high-level data flow of the proximity-based installer of FIG. 3, in accordance with various embodiments of the disclosure.

With reference to FIG. 4, a block diagram of a high-level data flow, in accordance with various embodiments of the disclosure is presented. Flow 400 is an example of a high level data flow in one illustrative embodiment using proximity-based installer 300 of FIG. 3.

A request to update a portion of machines on a network of machines using a software package arrives over flow 410 at centralized installer 302 of FIG. 3. The request is processed using pluggable rules engine 304 and rules 312, each of FIG. 3 using flow 412 and flow 414 respectively.

Install manager, centralized installer 302, obtains a specified software package from software repository 316 of FIG. 3 using flow 416. Centralized installer 302 using flow 418 sends the software package to a specified proximity group, such as proximity group 314 of FIG. 3 and to machine-1 404. In combination with the software package is a set of instructions causing machine-1 404 to install the software package.

Flow 420 and flow 422 provide instructions associated with the received request (including what software to download and from which device) to cause machine-2 406 and machine-3 408 respectively of proximity group 314 of FIG. 3 to obtain the software package from machine-1 404 as a download using flow 424 and flow 426 respectively and to install the obtained software package.

A notification of update progress or update completion is forwarded through flow 428 to a requester of request 402. A notification or confirmation may not be desired and therefore not sent, however a result can also be queried from centralized installer 302 of FIG. 3 using flow 410 with a result returned using flow 428.

Figure 5:
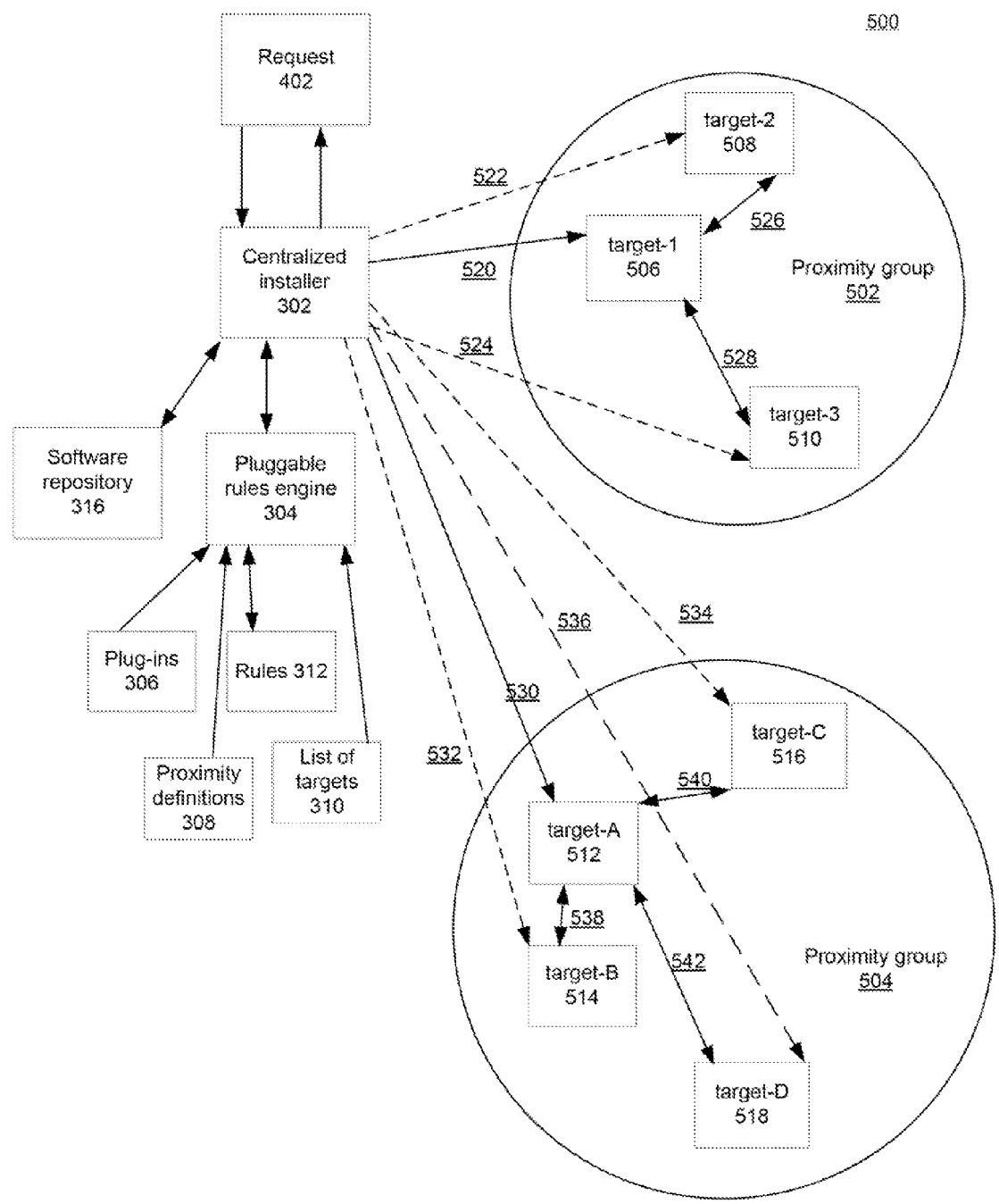
FIG. 5 is a block diagram of a high-level process overview of the proximity-based installer of FIG. 3, in accordance with various embodiments of the disclosure.

With reference to FIG. 5, a block diagram of a high-level process overview, in accordance with various embodiments of the disclosure is presented. Process 500 is an illustrative embodiment of a process using proximity-based installer 300 of FIG. 3.

Components, including centralized installer 302, pluggable rules engine 304, plug-ins 306, proximity definitions 308, list of machines 310 and rules 312, and software repository 316 all of FIG. 3 and request 402 of FIG. 4 are shown in the context of an installation process using process 500. For example, a central installation is requested of centralized installer 302 using seven target machines comprising target-1 506, target-2 508, target-3 510, target-A 512, target-B 514, target-C 516, and target-D 518.

The list of machines may be provided as part of the received request or from a previously stored list in list of machines 310, for example as a default setting, or read from a configuration file when centralized installer 302 starts. The list of machines is passed from centralized installer 302 to pluggable rules engine 304 for possible categorization into proximity groups. In the example of FIG. 5, proximity group 502 and proximity group 504 are formed using the provided list of machines and rules processing. The proximity groups formed comprise one or more proximity groups as determined by the candidates in the list of machines provided and applied rules.

Centralized installer 302 selects a machine within proximity group 502, such as target-1 506 and uploads the software package from software repository 316 using link 520 when a repository based install is used. In an alternative install, centralized installer 302 instructs the selected machine to download the software package from a specified predefined software repository. Selection of a machine may be performed using a preference, a random selection or other means including least used, last referenced, most used, based on network traffic or physical attributes including storage, processing or network capability, as well as location with reference to a central site or proximity to other machines or nodes within the respective proximity group.

Centralized installer 302 issues a command to run the install on target-1 506 using downloaded binaries of the software package, and in parallel issues commands on link 522 to target-2 508 and on link 524 to target-3 510 to start downloading binaries from target-1 506 using links 526 and link 528 respectively. As target-2 508 and target-3 510 download binaries of the software packages, centralized installer 302 issues a command to run the installs on target-2 508 and target-3 510.

In parallel with operations performed using proximity group 502, centralized installer 302 performs similar operations using machines of proximity group 504. Centralized installer 302 downloads binaries of the software package and issues a command on link 530 to run the install on target-A 512 using downloaded binaries of the software package, and in parallel issues commands on link 532 to target-B 514, on link 534 to target-C 516 and on link 536 to target-D 518 to start downloading binaries from target-A 510 using link 538, link 540 and link 542 respectively. As binaries of the software packages are downloaded by target-B 514, target-C 516, and target-D 518, centralized installer 302 issues a command to run the installs on target-B 514, target-C 516, and target-D 518.

The links shown in the example depict a payload of a software package in one embodiment and a set of instructions in another embodiment. Links may be combined as well as combinations of software package and instructions as needed and supported by an environment. However selection of a machine within a proximity group for a seed upload of a software package typically reduces network traffic and latency in receiving software packages on remaining targets with a proximity group. A need to split proximity groups to provide an increased number of seed targets is easily managed as shown in the examples provided using an adjustment to a rule definition and corresponding user defined rule.

Upon completion of the operations, all nodes of the proximity groups in the set of proximity groups are installed and the status is reported back to central installer 302 of FIG. 3. From the current example, only two out of seven binary transfers of the software package occur outside of proximity group boundaries, which is extremely important when a centralized installer is located in one geographic location such as Canada, one proximity group is located in Germany and another proximity group resides in China. In view of the illustrative embodiment, an extremely flexible highly parallel system is presented typically enabling quick enterprise software installs/updates while maintaining centralized view of the process and control over the master binaries of the software packages when compared with previous solutions.

Figure 6:
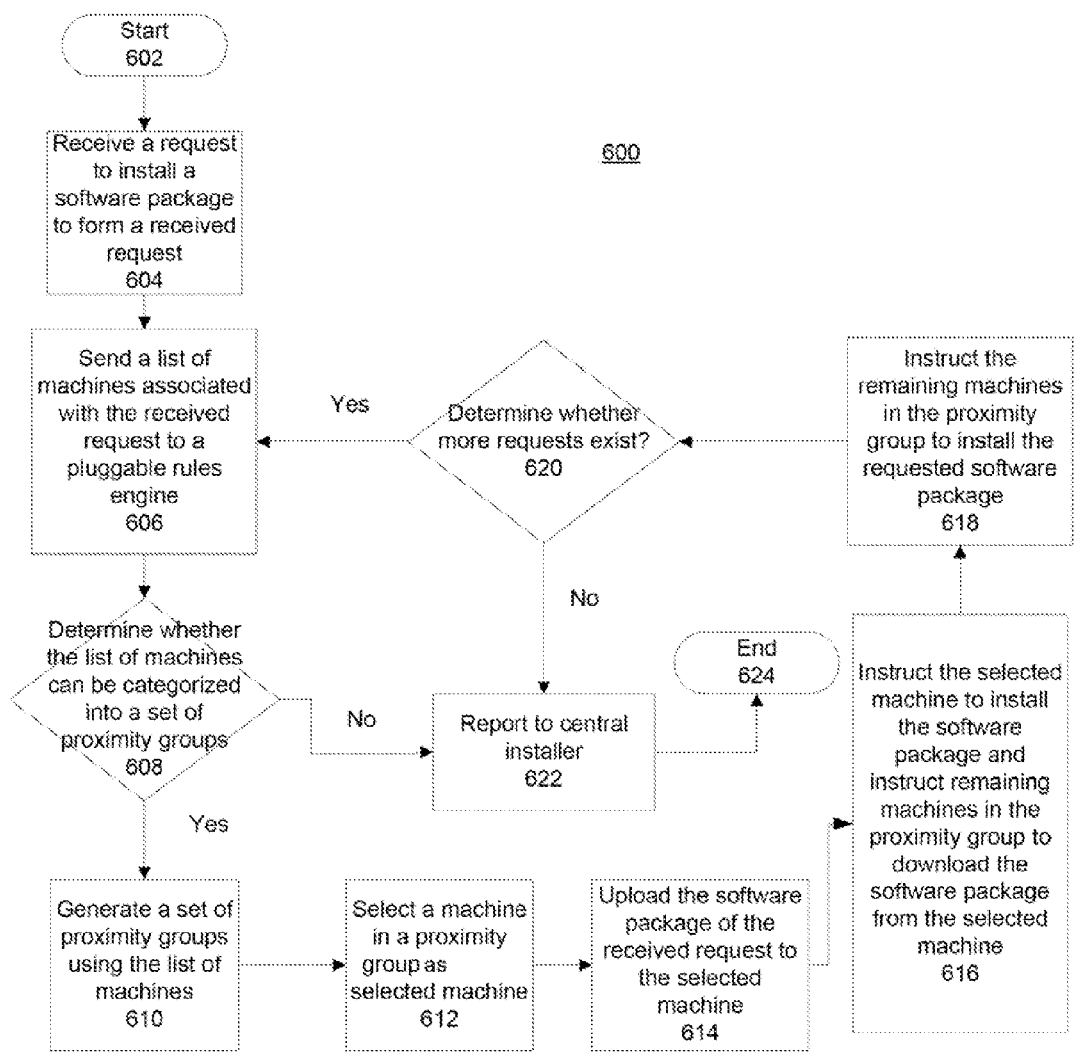
FIG. 6 is a flowchart of a centrally controlled proximity based software installation process, using the proximity-based installer of FIG. 3, in accordance with one embodiment.

With reference to FIG. 6, a flowchart of a centrally controlled proximity based software installation process, in accordance with one embodiment of the disclosure is presented. Process 600 is an example of a centrally controlled proximity based software installation process using proximity-based installer 300 of FIG. 3.

Process 600 begins (step 602) and receives a request (received request) to install or update a software package (step 604). A request typically contains a specified software package and set of target machines or nodes, as a list of machines, on which the software package is to be installed or updated, as specified using the requested operation. In an alternative example a request may comprise a set of requests, wherein each request comprises a specified software package and respective set of target machines or nodes on which the software package is to be installed or updated. Each request in the set of requests is processed individually. In another example, a request may comprise a set of interdependent requests, which are processed with respect to an order dependency. The list of machines can be explicitly provided as a set of machines with the request or pointed to by the request but is typically provided implicitly using the central installer, for example a configuration read during initialization or a default setting.

Process 600 sends a list of machines associated with the received request to a pluggable rules engine as possible target machines for processing (step 606). Process 600 determines, using the rules engine, whether the list of machines comprising target machines can be categorized into a set of proximity groups (step 608). The set of proximity groups comprises one or more proximity groups according to categorization performed by the rules engine using the list of machines received and one or more applicable rules. The pluggable rules engine may also have the plug-ins fixed in an alternative implementation.

Responsive to a determination that the list of target machines cannot be categorized into a set of proximity groups, process 600 skips ahead to step 622. Process 600 reports results of the categorization operation to a central installer (step 622) and terminates thereafter (step 624). In this case, the failure to categorize the list of target machines is reported, which may be further sent to a requester or used to initiate other action such as changing of rules, or specifying another set of machines.

Responsive to a determination that the list of machines can be categorized into a set of proximity groups containing target machines, process 600 generates a set of proximity groups for the received list of machines using available applicable rules (step 610). A set of proximity groups comprises one or more proximity groups created by the rules engine using an available applicable rule or rules selected from a set of rules.

For each identified proximity group in the set of proximity groups created by the rules engine, process 600 selects a machine (a "selected machine") to form a selected machine (step 612). Using an example of a single request and a single proximity group, process 600, using the central installer, uploads a requested software package of the received request to the selected machine in the proximity group of the set of proximity groups (step 614). When process 600 handles multiple proximity groups concurrently, the selection of a machine and uploading of the requested software package is performed for each proximity group in the set of proximity groups. Processing in this manner enables benefits accrued to parallel operations.

Process 600 additionally instructs the selected machine to install the requested software package and instructs the remaining machines in the respective proximity group of the selected machine to download the requested software package from the selected machine (step 616). Process 600 instructs the remaining machines in the respective proximity group of the selected machine to install the requested software package from the selected machine (step 618). Instruction may be provided in a separate request or a combined request with the download instruction to the machines of the respective proximity group or the requests may overlap; however the software package must be available at a machine prior to installation taking effect.

In an alternative operation when a repository based install is performed, process 600 instructs the selected machine to download the requested software package from a predefined software repository rather than pushing the requested software package out to the selected machine. This form of operation may be similar to a scenario of publish and subscribe in which the selected machine receives notification of the software availability and commences the process of installation. Operations proceed as previously described after the requested software package is received on the selected machine.

Process 600 determines whether more requests exist (step 620). Responsive to a determination that more requests exist, process 600 loops back to step 606 and performs as before. Responsive to a determination that no more requests exist, process 600 sends a report to the central installer (step 622) and terminates thereafter (step 624).

Thus is provided, in one illustrative embodiment, a computer-implemented process for centrally controlled proximity based software installation. The centrally controlled proximity based software installation provides an enterprise install using a central governor, which pushes a software package down to peer groups of systems, according to user-defined proximity rules, and leverages peer-to-peer mechanism to populate the installations within those groups. The computer-implemented process receives a request to install a software package, sends a list of machines associated with the received request to a rules engine, and generates a set of proximity groups using the list of machines. The computer-implemented process uploads the software package of the received request to a selected machine within a proximity group of the set of proximity groups, instructs the selected machine to install the software package and instructs the remaining machines associated with the proximity group of the selected machine to download the software package from the selected machine, instructs the remaining machines to install the software package, and responsive to a determination no more requests exist, reports to a central installer.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium/device containing instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for performing a centrally controlled proximity based software installation by a computer, the computer-implemented process comprising:
    receiving a request to install a software package;
    generating a plurality of proximity groups from a list of machines, wherein the list of machines identifies a plurality of machines;
    pushing the software package to only a selected machine within a proximity group of the plurality of proximity groups, wherein the proximity group includes the selected machine and one or more remaining machines, and wherein the selection of the selected machine for the proximity group and the pushing the software package to only the selected machine within the proximity group is performed concurrently for each proximity group in the plurality of proximity groups;
    instructing the selected machine to install the software package;
    instructing the one or more remaining machines in the proximity group to download the software package from the selected machine;
    in response to the selected machine installing the software package and the one or more remaining machines downloading the software package from the selected machine, instructing the one or more remaining machines to install the software package; and
    in response to determining that no more requests exist, reporting to a central installer.

2. The computer-implemented process of claim 1, wherein generating the plurality of proximity groups using the list of machines further comprises:
    sending the list of machines associated with the received request to a rules engine;

receiving a set of user-defined rules that includes a set of proximity definitions, wherein the set of user-defined rules is processed by a plug-in of the rules engine;

determining whether the list of machines can be categorized into the plurality of proximity groups; and in response to determining the list of machines cannot be categorized into the plurality of proximity groups, reporting to a central installer.

3. The computer-implemented process of claim 1, wherein pushing only the software package of the received request to the selected machine within the proximity group of the plurality of proximity groups further comprises:

selecting one of an upload instruction and a download instruction for transmission to the selected machine, wherein the download instruction includes a specified pre-determined software repository from which the selected machine can download the software package.

4. The computer-implemented process of claim 1, wherein pushing only the software package of the received request to the selected machine within the proximity group of the plurality of proximity groups further comprises:

selecting a particular machine in the proximity group of the plurality of proximity groups as the selected machine, wherein the selected machine provides a seed of the software package for downloading by the one or more remaining machines in the proximity group.

5. The computer-implemented process of claim 1, further comprising:

leveraging a peer-to-peer mechanism to populate installations within the proximity group of the plurality of proximity groups.

6. The computer-implemented process of claim 1, wherein the plurality of proximity groups is dynamically formed using the received request and the list of machines, and the plurality of proximity groups have a transient property.

7. A computer program product for a centrally controlled proximity based software installation, the computer program product comprising a non-transitory computer storage device containing computer executable program code stored thereon, the computer executable program code comprising computer executable program code for:

receiving a request to install a software package;

generating a plurality of proximity groups from a list of machines, wherein the list of machines identifies a plurality of machines;

pushing the software package to only a selected machine within a proximity group of the plurality of proximity groups, wherein the proximity group includes the selected machine and one or more remaining machines, and wherein the selection of the selected machine for the proximity group and the pushing the software package to only the selected machine within the proximity group is performed concurrently for each proximity group in the plurality of proximity groups;

instructing the selected machine to install the software package;

instructing the one or more remaining machines in the proximity group to download the software package from the selected machine;

in response to the selected machine installing the software package and the one or more remaining machines downloading the software package from the selected machine, instructing the one or more remaining machines to install the software package; and in response to determining no more requests exist, reporting to a central installer.

8. The computer program product of claim 7, wherein the computer executable program code for generating a set of proximity groups using the list of machines further comprises code for:

sending the list of machines associated with the received request to a rules engine;

receiving a set of user-defined rules using a set of proximity definitions, wherein the set of user-defined rules is processed by a plug-in of the rules engine;

determining whether the list of machines can be categorized into the plurality of proximity groups; and responsive to determining the list of machines cannot be categorized into the plurality of proximity groups, reporting to a central installer.

9. The computer program product of claim 7, wherein the computer executable program code for pushing only the software package of the received request to the selected machine within the proximity group of the plurality of proximity groups further comprises code for:

selecting one of an upload instruction and a download instruction for transmission to the selected machine, wherein the download instruction includes a specified pre-determined software repository from which the selected machine can download the software package.

10. The computer program product of claim 7, wherein the computer executable program code for pushing only the software package of the received request to the selected machine within the proximity group of the plurality of proximity groups further comprises code for:

selecting a particular machine in the proximity group of the plurality of proximity groups as the selected machine, wherein the selected machine provides a seed of the software package for downloading by the one or more remaining machines in the proximity group.

11. The computer program product of claim 7, wherein the computer executable program code further comprises code for:

leveraging a peer-to-peer mechanism to populate installations within the proximity group of the plurality of proximity groups.

12. The computer program product of claim 7, wherein the plurality of proximity groups is dynamically formed using the received request and the list of machines, and the plurality of proximity groups have a transient property.

13. An apparatus for a centrally controlled proximity based software installation, the apparatus comprising:

a communications fabric;

a memory connected to the communications fabric, wherein the memory contains computer executable program code;

a communications unit connected to the communications fabric; and a processor unit connected to the communications fabric, wherein the processor unit executes the computer executable program code to direct the apparatus to:

receive a request to install a software package to form a received request;

generate a plurality of proximity groups from a list of machines, wherein the list of machines identifies a plurality of machines;

push the software package to only a selected machine within a proximity group of the plurality of proximity groups, wherein the proximity group includes the selected machine and one or more remaining machines, and wherein the selection of the selected machine for the proximity group and the push of the software package to only the selected machine within the proximity group is performed concurrently for each proximity group in the plurality of proximity groups;

instruct the selected machine to install the software package;

instructing the one or more remaining machines in the proximity group to download the software package from the selected machine;

in response to the selected machine installing the software package and the one or more remaining machines downloading the software package from the selected machine, instruct the remaining machines to install the software package; and in response to determining that no more requests exist, report to a central installer.

14. The apparatus of claim 13, wherein the computer executable program code that generates the plurality of proximity groups using the list of machines includes the processor unit executing program code that further comprises code that directs the apparatus to:

send a list of machines associated with the received request to a rules engine;

receive a set of user-defined rules using a set of proximity definitions, wherein the set of user-defined rules is processed by a plug-in of the rules engine;

determine whether the list of machines can be categorized into the plurality of proximity groups; and in response to determining the list of machines cannot be categorized into the plurality of proximity groups, report to a central installer.

15. The apparatus of claim 13, wherein the computer executable program code that pushes only the software package of the received request to the selected machine within the proximity group of the plurality of proximity groups and further comprises code that directs the apparatus to:

select one of an upload instruction and a download instruction for transmission to the selected machine, wherein the download instruction includes a specified pre-determined software repository from which the selected machine can download the software package.

16. The computer-implemented process of claim 13, wherein the computer executable program code that pushes only the software package of the received request to the selected machine within the proximity group of the plurality of proximity groups and further comprises code that directs the apparatus to:

select a particular machine in the proximity group of the plurality of proximity groups as the selected machine, wherein the selected machine provides a seed of the software package for downloading by the one or more remaining machines in the proximity group.

17. The apparatus of claim 13, wherein the computer executable program code further comprises code that directs the apparatus to:

leverage a peer-to-peer mechanism to populate installations within the proximity group of the plurality of proximity groups.

* * * * *